United States Patent [19]

Hureau et al.

[11] 3,932,092

[45] Jan. 13, 1976

[54] APPARATUS FOR MAKING PLASTICS MESH STRUCTURES AND OTHER FORMS OF OPENWORK

[75] Inventors: Jean-Claude Hureau, Maurepas; Benjamin Rota, Noisy Le Sec; Philippe Thomas-Castelnau, Paris, all of France

[73] Assignee: Generale Alimentaire, Neuilly-sur-Seine, France

[22] Filed: Aug. 21, 1974

[21] Appl. No.: 499,205

Related U.S. Application Data

[62] Division of Ser. No. 304,818, Nov. 8, 1972, Pat. No. 3,874,969.

[30] Foreign Application Priority Data

Nov. 10, 1971  France .............................. 71.40270
Dec. 15, 1971  France .............................. 71.45140

[52] U.S. Cl. ................ 425/382; 156/500; 264/167; 425/464; 425/465

[51] Int. Cl.² ........................................... B29F 3/04
[58] Field of Search ....... 425/224, 382 N, 464, 465, 425/470; 264/167; 156/500

[56] References Cited

UNITED STATES PATENTS

| | | | |
|---|---|---|---|
| 3,252,181 | 5/1966 | Hureau | 425/465 X |
| 3,349,434 | 10/1967 | Hureau | 425/464 |
| 3,600,751 | 8/1971 | Fairbanks | 425/464 |
| 3,767,353 | 10/1973 | Gaffney | 425/464 |

*Primary Examiner*—Robert L. Spicer, Jr.
*Attorney, Agent, or Firm*—Brumbaugh, Graves, Donohue & Raymond

[57] ABSTRACT

A plastics mesh structure comprises continuous filaments in the longitudinal direction and discontinuous connecting strands in the lateral direction.

10 Claims, 20 Drawing Figures

APPARATUS FOR MAKING PLASTICS MESH STRUCTURES AND OTHER FORMS OF OPENWORK

This is a division, of application Ser. No. 304,818 filed Nov. 8, 1972, now U.S. Pat. No. 3,874,969.

This invention relates to openwork structures, more particularly to a novel kind of flat or tubular mesh structure of plastics which is dimensionally stable in the machine direction but which can have transverse stretch.

A mesh structure of this kind comprises a body of continuous filaments in the machine direction and discontinuous strands bracing the continuous filaments in the transverse direction.

In a first form of the invention, the mesh structure according to the invention has curvilinear meshes and comprises in the machine direction a tubular or flat body of continuous curvilinear filaments and in the transverse direction discontinuous strands each interposed between two adjacent continuous filaments, the strands being welded by their ends to the continuous filaments in the places of minimum spacing between the continuous filaments without overlapping the same at the junctions, the strands of any one row being offset from the strands of the adjacent row.

In a variant of this first form, the continuous curvilinear filaments are interconnected in pairs by discontinuous transverse strands whose ends are placed on the continuous filaments, the strands of any two adjacent longitudinal rows being disposed alternately on either side of the body of filaments.

In a second form, the mesh structure according to the invention has staggered meshes and comprises in the machine direction a flat or tubular body of parallel straight continuous filaments and in the transverse direction discontinuous strands aligned in transverse rows placed on the continuous filaments on one side of the body thereof, and similar discontinuous strands aligned in transverse rows disposed on the other side of the filaments and offset from the first row.

In a variant of this form, the discontinuous strands extend over some but not all of the continuous filaments.

The invention also relates to a process for making plastics flat or tubular mesh structures and other forms of openwork, the structures being dimensionally stable in the machine direction and possibly having transverse stretch, the process comprising separately extruding: continuously, a flat or tubular body of continuous filaments, which may or may not be straight, parallel to the extrusion direction, and periodically and transversely to the continuous filaments, discontinuous strands of a length at least equal to the between-filaments spacing, whereafter the strands are thrust between or on to the filaments to be welded thereto.

More particularly, two rows of discontinuous transverse strands are extruded alternately on to alternate sides of the body of continuous filaments opposite the spaces between the filaments, and one row of extruded strands is, in alternation with the other row, pressed between the continuous filaments in one part of the spaces while the other row of extruded strands is pressed into the other part of the spaces, to weld the strands by their ends to the filaments.

In a variant leading to a mesh structure having staggered or offset meshes, two rows of discontinuous transverse strands are extruded simultaneously and alternately on to both sides of the body of continuous filaments opposite the spacings between the filaments, and all the extruded strands are thrust simultaneously between the continuous filaments in all the spaces therebetween to weld the strands by their ends to the filaments. The mesh structure thus devised has square or rectangular meshes.

Another variant comprises: extruding a body of continuous filaments parallel to the extrusion direction; periodically extruding on to one side of such body a first row of discontinuous aligned transverse strands longer than the between-filaments spacing; and periodically extruding on to the other side of the body of filaments a second row of discontinuous aligned transverse strands longer than the between-filaments spacing and offset from the first-row strands, the first row of extruded strands being thrust on to the continuous filaments so as to position each transverse strand on at least two adjacent continuous filaments but not on all the filaments of the body, the second row of extruded strands being thrust alternately or simultaneously on to the continuous filaments so as to place each transverse strand on at least two adjacent continuous filaments not joined together by the first-row strands, and so on. The resulting mesh structure has staggered meshes or rectangular or square meshes with transverse strands straddling the continuous filaments.

In another variant, two rows of discontinuous aligned transverse strands are extruded alternately just on to one side of the body of continuous filaments opposite the spaces therebetween, and alternately some of the extruded strands are thrust between the continuous filaments into some of such spaces and the remainder of the extruded strands are thrust between the continuous filaments in another part of the spaces, to weld the strands by their ends to the filaments. The resulting structure is a mesh structure having staggered meshes.

In another variant, a single row of discontinuous transverse strands is extruded just on to one side of the body of continuous filaments opposite the spaces therebetween and such strands are thrust simultaneously between the continuous filaments into all the spaces simultaneously, to weld the strands by their ends to the filaments. The resulting mesh structure has square or rectangular meshes.

According to another feature of the invention, the extruded mesh structure is given simultaneous two-directional drawing and cooling treatment. If the discontinuous strands have greater mechanical strength transversely than the transverse strength of the continuous filaments before two-directional drawing, the result is a mesh structure whose continuous filaments are curvilinear.

The invention also relates to an apparatus for carrying out the process just described.

Such an apparatus comprises an extrusion head adapted to be fed with plastics from an appropriate source such as an extruder, the head comprising:

a. a die plate having a row of continuously open aligned or coplanar orifices for extruding a body of continuous filaments parallel to the extrusion direction;

b. at least one other die plate having a row of discontinuous-extrusion slits in length at least equal to the spacing between the extrusion orifices, the slits being aligned or distributed in one plane different from the plane of the extrusion orifices and opposite the spaces therebetween, to extrude discontinuous transverse strands;

c. at least one moving blade associated with such other die plate and reciprocating past the extrusion slits, the amplitude of the reciprocation being greater than slit width, to open and close the slits alternately and fundamentally to thrust the extruded discontinuous transverse strands between the extruded continuous filaments and weld the strands thereto, and d. if necessary, a cooling template for simultaneous two-directional orientation and cooling of the extruded mesh structure to impart the final shape and orientation thereto during cooling.

In a first embodiment of the apparatus according to the invention, the extrusion head comprises:

a. a die plate having a row of aligned or coplanar continuous-extrusion orifices for extruding continuous filaments;

b. two other die heads disposed one on each side of the die head and each formed with a row of extrusion slits in length substantially equal to the between-orifices spacing and offset from one die head to the other, for extruding the transverse strands;

c. two moving blades associated one each with one of the two other die plates and moving past the openings of the extrusion slits in the corresponding die plate and periodically reciprocating to the same hand or in opposite directions, to open and close the die plate extrusion slits alternately or simultaneously and basically to thrust the extruded strands between the extruded filaments and weld the strands by their ends of the filaments, and d. if necessary, a cooling template for simultaneous two-directional orientation and cooling of the extruded mesh structure so as to impart the final shape and orientation thereto during cooling.

In a variant of this form, the continuous-extrusion orifices are disposed radially in a single plane, and the strand extrusion slits are disposed opposite the between-orifices spaces but alternately above and below the plane, the transverse dimension of the extrusion slits being greater than the between-orifices spacing, the extrusion head having two parallel blades whose operative surfaces are near one another and which reciprocate in the same direction so that they can open the extrusion slits above the extrusion orifices and thrust the extruded strands below on to the continuous filaments by placing the strands thereon on one side of the body of filaments, the extrusion slits for the bottom strands then being closed, whereafter conversely the extrusion slits disposed below the extrusion orifices are opened and the extruded strands are thrust from above on to the strands by being placed thereon on the other side of the body of continuous filaments, whereafter the top strand extrusion slits are closed.

In a variant, the extrusion slits for one of the rows are connected individually to the extrusion orifices by passages, so that each slit which is disposed opposite the space between two adjacent orifices is connected thereto by passages, so that the discontinuous transverse strands extruded through the slits are welded to the continuous filaments extruded through such orifices before any action by the blades.

In another embodiment of the apparatus according to the invention, the extrusion head comprises:

a. a die plate formed with a row of aligned or coplanar continuous-extrusion orifices for extruding the continuous filaments;

b. a second die plate disposed above or below the first die plate and formed with a row of extrusion slits in length substantially equal to the spacing between the extrusion orifices and disposed opposite the spaces therebetween, to extrude the transverse strands, and c. a moving blade associated with a second die plate and reciprocating past the orifices of the extrusion slits to open or close the same and fundamentally to thrust the extruded strands between the extruded filaments and weld the strands by their ends of the filaments.

In a variant of this form, two complementary moving blades are associated with a second die plate, one blade reciprocating past some of the extrusion slits and the other blade reciprocating past the remainder thereof.

Consequently, in the embodiments hereinbefore described the exit of the extrusion slits is alternately or simultaneously opened or closed by reciprocating blades which also have the basic job of thrusting the extruded strands between the continuous filaments. The strands are therefore either interposed between the continuous filaments or placed thereon. The welding step is performed immediately upon leaving the die plate, the plastics still being hot enough for a satisfactory weld to be made between the longitudinal filaments and the transverse strands. Since the extrusion orifices are independent of one another, the moving blades must, after they have closed the extrusion slits, thrust the extruded transverse strands between or on to the continuous filaments so as to form a mesh structure. If the moving blades move synchronously to the same hand, the resulting mesh structure has alternate meshes whose shape depends upon the relative orientation of the filaments and the strands on the exit sizing rolls; if, on the other hand, the moving blades move synchronously but to opposite hands, the resulting mesh structure has square or rectangular meshes.

A very wide variety of mesh structure shapes can usually be provided by varying the shape, dimension and arrangement of the various extrusion orifices and slits and the relative movement of the two blades.

Another great advantage of the invention is that, since the extrusion orifices and slits are all completely independent of one another, combinations of colours or even of different materials can be arranged for by means of different feeds, to provide multicolour mesh structures or mesh structures having a variety of characteristics.

The preferred shape of the device is a shape of revolution. Some devices of this kind have been shown flat in the accompanying drawings to simplify the illustration.

The invention will be described in greater detail hereinafter with reference to the accompanying drawings wherein.

Figure 1:
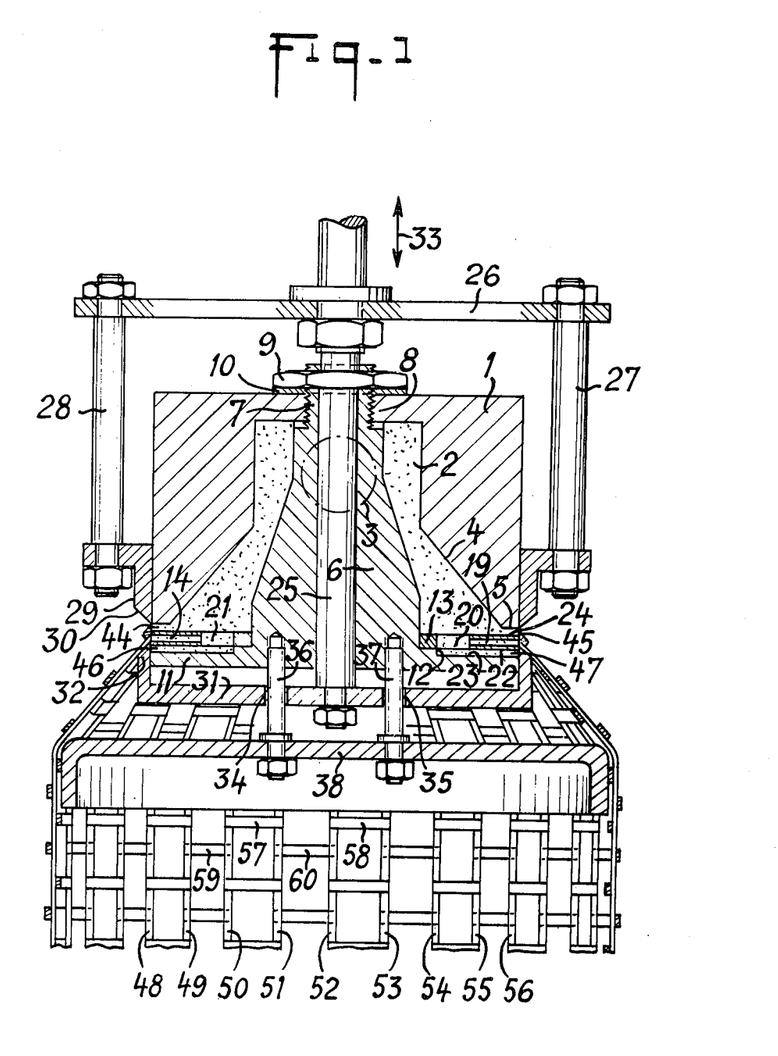
FIG. 1 is a sectioned elevation of an extrusion head having circular die plates according to the invention for making tubular mesh structures.
Figure 2:
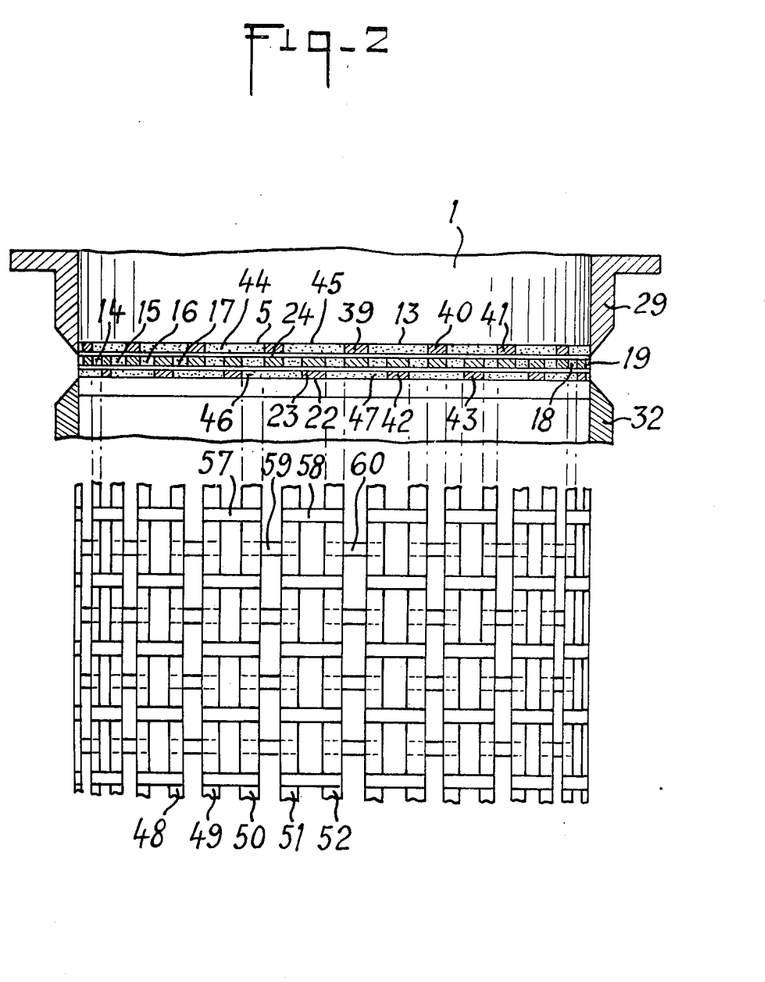
FIG. 2 is a partial view of the extrusion head of FIG. 1 in very simplified form, the aim of the figure being to show just the arrangement of the three die plates and the blades, shown in section, and a piece of the tubular mesh structure produced.

As can be seen in FIGS. 1 and 2, an extrusion head according to the invention mainly comprises a cylindrical block 1 having a chamber 2 for the plastics to pass through, chamber 2 communicating by way of orifice 3 with an appropriate source of plastics (not shown) such as an extruder. Chamber 2 flares downwardly and outwardly in the form indicated by wall element 4, which is followed by a wall element 5 disposed in a plane perpendicular to the extrusion head axis.

Disposed at the centre of the head is an axial core 6 having a screw-threaded shank 7 screwed into a tapped portion 8 of the extrusion head and extending therebeyond to receive, with the interposition of a washer 10, a locknut 9. Core 6 terminates at the bottom in a disc 11 of the same diameter as the block 1. Disc 11 has a shoulder 12 to which the secured a disc-like die plate 13 having radial extrusion passages 14–19 whose exit orifices are disposed vertically in line with the periphery of block 1 and whose entry apertures, which are on the same side as the extrusion head axis, communicate with the chamber 2 by way of wide apertures 20, 21 with which disc 13 is formed to supply all the radial passages 14–19.

Bottom surface 22 of die plate 13 cooperates with top surface 23 of disc 11 to form a second die plate whose exit orifice, in the form of an annular extrusion slot, is open in vertical alignment with the periphery of block 1. Top surface 24 of die plate 13 cooperates with surface 5 of block 1 to form a third extrusion die plate similar to the one formed by the surfaces 22, 23 on the other side of die plate 13.

A rod 25 guided without backlash in core 6 bears at the top, with the interposition of a plate 26 and cross-members 27, 28, a short tubular member 29 whose bottom edge 30 is bevelled to form a knife or blade or the like. Secured to the bottom end of rod 25 is a domed member 31 having a bevelled lip 32 forming a second blade or knife or the like having a lip so disposed relatively to the lip of blade 30 that, when blade 32 closes the bottom annular extrusion orifice bounded by surfaces 22, 23, blade 30 is completely clear of the top annular extrusion orifice bounded by surfaces 24 and 5.

The moving system formed by the two blades interconnected by the integers 27, 28, cross-piece 26 and rod 25 is reciprocated axially in the direction indicated by a double arrow 33, by means which are not shown.

The domed member 31 is formed with two apertures 34, 35 through which two screwed fasteners 36, 37 extend, the same being screwed into the core 6 and bearing a template or jig or the like 38.

To produce non-contiguous transverse strips of a kind to be described hereinafter, the annular extrusion orifices have the following features:

Disposed in the top extrusion orifice bounded by surfaces 5 and 24 are radial partitions, as 39–41, which are disposed in registration with the gaps between a pair of two adjacent radial passages of the passages 14–19. Disposed in the bottom extrusion orifice bounded by surfaces 22 and 23 are radial partitions 42, 43 which are offset from the previous radial partitions 39–41. The radial partitions 39–43 are contrived, e.g. by machining of the surfaces 22, 24 of the disc 13 on its periphery. The top die plate therefore comes to be formed with extrusion orifices, as 44, 45, each extending to two radial passages 14–19; the bottom die plate is formed with extrusion orifices, as 46 and 47, which are so offset from the orifices 44, 45 as to extend to two passages 14–19 to which the top die plate orifices 44, 45 do not extend.

The apparatus as described operates as follows:

With the blades positioned as in FIG. 1 relatively to the various die plates, which are stationary, the radial passages 14–19 are open and the plastics issues from them in the form of a body of continuous vertical filaments, as 48–56. No material can discharge through the bottom die plate bounded by the orifices 46, 47 since the same are blocked by the bottom blade 32. However, plastics can discharge through the top die plates bounded by the extrusion orifices 44, 45 in the form of discontinuous transverse strands or pieces or the like, as 57, 58, formation thereof being interrupted when the blade assembly descends into the bottom position visible in FIG. 2 in which the top blade 30 closes the orifices 44, 45 and thrusts the extruded strands 57, 58 e.g. against the pairs of continuous filaments 49, 50 and 51, 52 respectively, the strands becoming welded to the filaments, whereas the bottom blade 32 opens the orifices 46, 47 for the extrusion of discontinuous transverse strands, as 59, 60, which are thrust against and welded to the other surface of the vertical filaments when the blades rise, to interconnect, e.g. the continuous filament pairs 50, 51 and and 52, 53 not connected by the previously extruded strands 57, 58.

Clearly, therefore, while the blade assembly moves between its two end positions, the continuous vertical filaments of the openwork structure are extruded continuously while discontinuous transverse pieces 57, 58 (on one side) and 59, 60 (on the other side) are formed alternately on the two surfaces of the body of continuous filaments, the integers 59, 60 being offset axially and transversely from the integers 57, 58.

The resulting openwork structure is a tubular mesh structure having alternate meshes comprising parallel straight continuous filaments in the machine direction and, transversely, discontinuous strands or the like aligned in rows applied to the filaments on one side of the body thereof, and similar discontinuous webs aligned in rows and applied to the filaments on the other side of the body thereof and with an offset from the strands applied to the first side.

Figure 3:
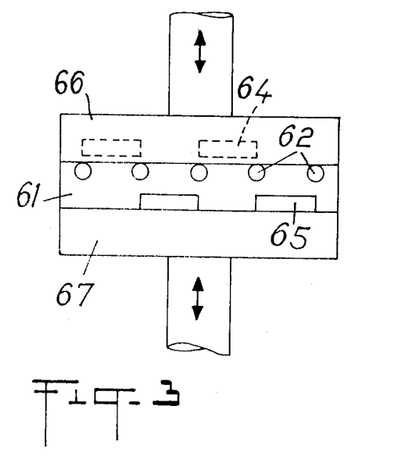
FIG. 3 is a diagrammatic view of another form of extrusion head according to the invention for mesh making.
Figure 4:
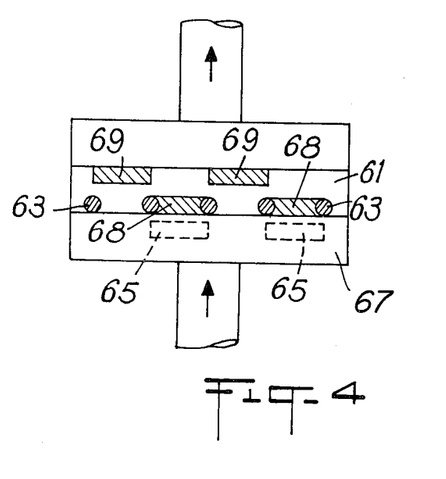
FIGS. 4 and 5 are views of the extrusion head of FIG. 3 with the blades in one end position in FIG. 4 and in another end position in FIG. 5.
Figure 5:
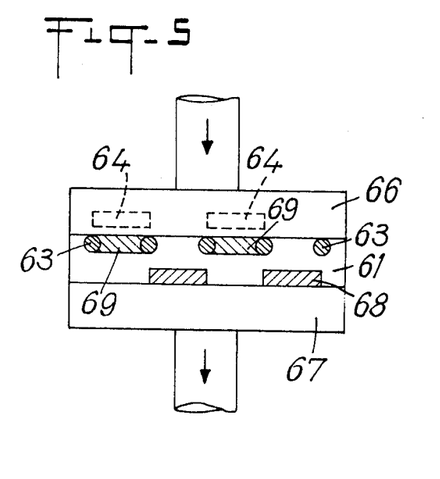

In the embodiment shown in FIGS. 3 to 5 of the drawings, extrusion head 61 comprises:

a row of equidistant extrusion passages 62 which are e.g. of substantially circular cross-section and which form a die plate to extrude continuous filaments 63, and two rows of extrusion orifices 64, 65 which are in cross-section e.g. substantially rectangular, in length substantially equal to the spacing between individual passages 62 and in width substantially equal to the diameter thereof, the orifices 64, 65 being distributed alternately above and below the passages 62 and opposite the spaces therebetween to form two more die plates for extruding cross-strands 68, 69.

Two moving blades or knives or the like 66, 67 which are vertically reciprocated periodically and synchronously, the amplitude of such movement being equal to the distance between the bottom edge of the extrusion orifices 65 and the bottom edge of the passages 62, move past the openings of the two series of orifices 64, 65. Consequently, when the blades 66, 67 are at the end of their downwards movement, as shown in FIG. 3, the top blade 66 completely closes the top orifices 64 and the bottom blade 67 leaves fully open the bottom orifices 65 and a number of cross-strands 68 are extruded through the bottom orifices 65, as can be seen in FIG. 6.

During the rising movement, as shown in FIG. 4, the bottom blade 67 closes the bottom orifices 65 and forces the extruded strands 68 between the continuous filaments 63, e.g. in the even spaces or intervals between the continuous filaments, so as to weld the strand ends to the filaments, whereas the top blade 66 leaves the top orifices 64 completely clear and a further series of cross-strands 69 are extruded therethrough.

During a further descent, as shown in FIG. 5, the top blade 66 closes the top orifices 64 and forces the extruded strands 69 between the continuous filaments 63 in the odd spaces therebetween so as to weld the ends of strands 69 to the filaments, whereas the bottom blade 67 opens up the bottom orifices 65 for the extrusion of a further series of cross-strands 68, and so on.

Figure 6:
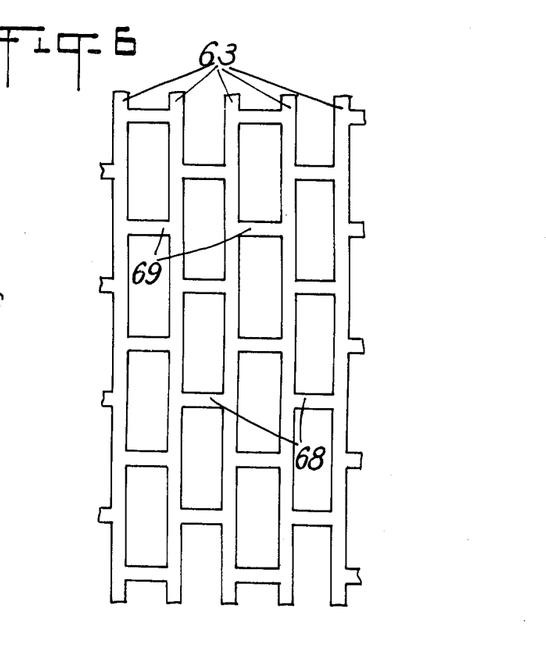
FIG. 6 is a view of a mesh structure comprising staggered rectangular meshes, produced by the extrusion head of FIG. 3.

The die plates therefore deliver a structure of offset rectangular meshes which, after two-directional drawing on a sizing roll, with simultaneous cooling, are of the shape shown in FIG. 6. The meshes comprise, in the machine direction, straight parallel continuous filaments 63 joined together in pairs by straight cross-pieces 68, 69 of substantially the same cross-section as the filaments 63, between which the integers 68, 69 are interposed and to which they are rigidly secured by their ends but without straddling them at the junctions.

A mesh structure of this kind is dimensionally stabilized in the direction of the continuous filaments (in the direction of machine length) but has stretch in the direction of the cross-pieces (transversely).

Figure 7:
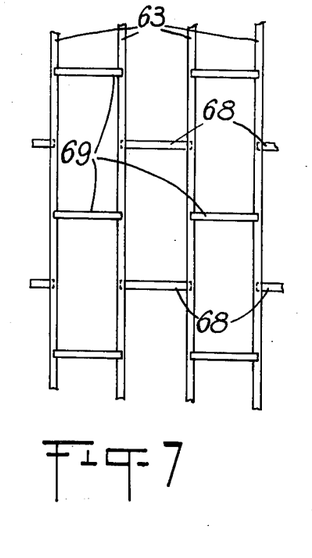
FIG. 7 is a view of the staggered rectangular mesh pattern in which interlaced strands straddle the body of continuous filaments alternately on both sides of such body.

If, however, the orifices 64, 65 are longer than the separation between the passages 62 and if the amplitude of the reciprocating movement of the blades 66, 67 is appreciably less than the distance between the bottom edge of the orifices 64 and the top edge of the passages 62, the mesh structure produced by two-directional drawing is of the kind comprising offset rectangular meshes, comprising a body of straight parallel continuous filaments joined together in pairs by cross-strands straddling the continuous filaments alternately on either side of the body thereof, as shown in FIG. 7; the mesh structure shown therein is identical to the mesh structure shown in FIGS. 1 and 2.

Figure 8:
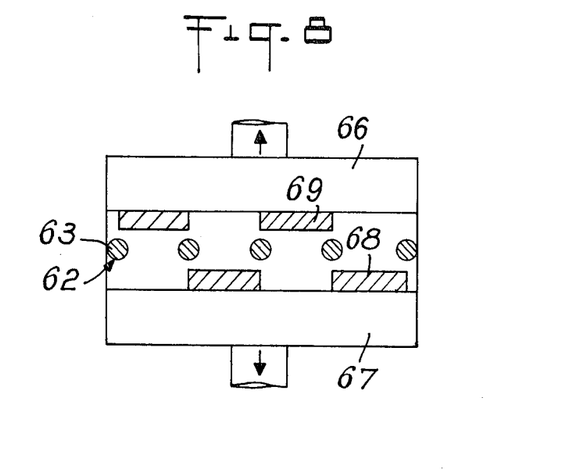
FIGS. 8 and 9 are views of an alternative form of FIG. 3.
Figure 9:
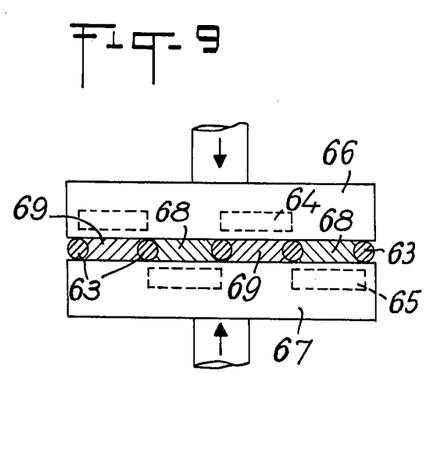

In the variant shown in FIGS. 8 and 9, the moving blades 66, 67 periodically make opposite simultaneous reciprocations of an amplitude substantially equal to the distance between the top edge of the orifices 64 and the top edge of the passages 62. In this case, at the end of the downwards travel of the bottom blade 67 and of the upwards travel of the top blade 66 (FIG. 8) the extrusion orifices 64, 65 are both simultaneously opened up by the blades and the two series of cross-strands 68, 69 are extruded simultaneously through the two series of orifices 64, 65.

Figure 10:
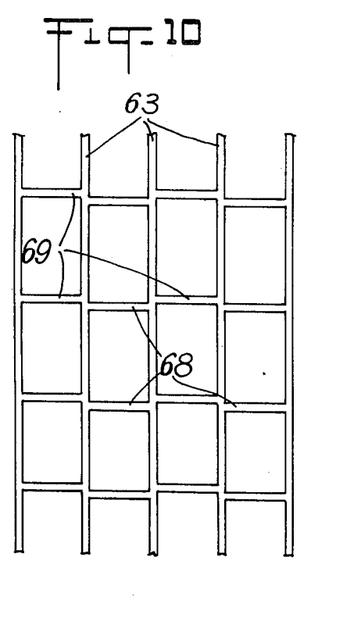
FIG. 10 shows a rectangular mesh structure produced by the head of FIG. 8.

On the other hand, when the bottom blade 67 finishes its rising movement and the top blade 66 finishes its descending movement (FIG. 9), the orifices 64, 65 are closed by the blades and the extruded strands 68, 69 are thrust simultaneously between the continuous filaments 63 extruded through the channels 62 (for instance, the strands 68 are thrust into the even spaces and the strands 69 into the odd spaces between the filaments) so as to weld the strand ends to the filaments without overlapping thereof at the junctions. The mesh structure obtained after two-directional drawing on a template is shown in FIG. 10 and has substantially rectangular meshes.

Figures 11, 12:
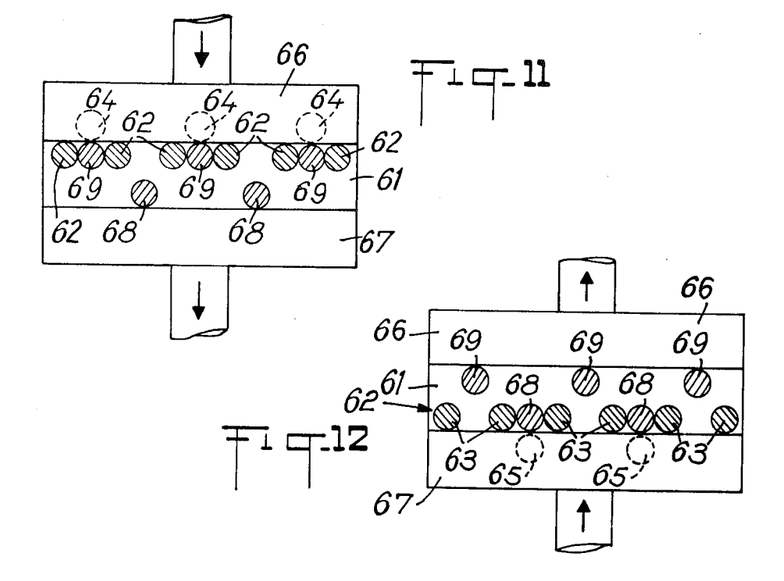
FIGS. 11 and 12 are views of another alternative form of FIG. 3.

In another variant, shown in FIGS. 11 and 12, the extrusion head 61 has:

a row of substantially circular cross-section extrusion channels 62 separated from one another by a distance substantially equal to the diameter of the passages, the whole forming a die plate for extruding the continuous filaments 63, and two other rows of substantially circular cross-section extrusion passages 64, 65 which are identical in cross-section to the passages 62 and which are distributed alternately thereabove and therebelow opposite the spaces between the passages 62, to form two more die plates for extruding the transverse strands 68, 69.

Two periodically and synchronously vertically reciprocating blades 66, 67 move past the apertures of the two systems of passages 64, 65, the amplitude of their movement being substantially equal to the distance between the bottom edge of the passages 65 and the bottom edge of the passages 62. When the blades are at the end of their downwards movement (FIG. 11), the bottom passages 65 are completely clear and a number of transverse strands 68 are extruded therethrough; the top passages 64 are closed by the top blade 66, but the strands 69 extruded through the passages 64 are thrust by the blade 66 against the continuous filaments 63 extruded through the passages 62 (e.g. in the odd spaces between the filaments 63) so as to weld the strands to the filaments. When the blades reach the end of their rising movement (FIG. 12), the top passages 64 are clear to extrude a further series of strands 69 but the bottom passages 65 are closed by the bottom blade 67, which thrusts the extruded strands 68 between the continuous filaments 63 (for instance, into the even spaces therebetween) so as to weld the strands to the filaments, and so on.

Figure 13:
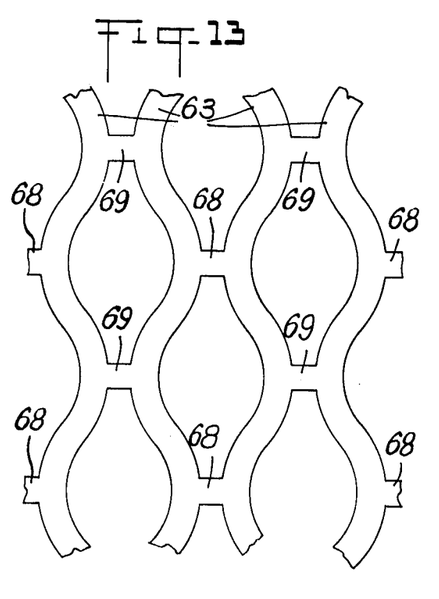
FIGS. 13 and 14 show the curvilinear mesh structures produced by the head of FIG. 11.
Figure 14:
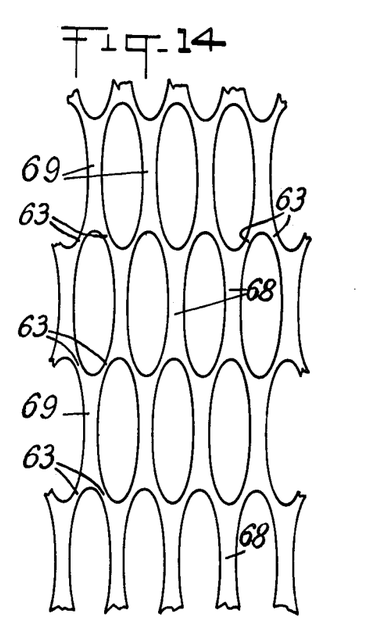

FIGS. 13 and 14 show the mesh structure prepared after two-directional drawing on a template with simultaneous cooling. The structure has staggered meshes formed by curvilinear continuous filaments 63 interconnected in pairs by cross-pieces 68, 69 which can be either straight, as shown in FIG. 13, or have curved edges, as shown in FIG. 14; the integers 68, 69 are interposed between the continuous filaments and rigidly secured thereto in places of minimum spacing between the filaments.

This kind of net has a very slight stretch in the machine direction and high transverse stretch and is of use inter alia for packing nets for citrus fruits (the absence of overlap at junctions greatly reduces the risk of damaging fragile citrus fruits), reinforcements for large-capacity bags and sacks, and mesh structures for closures. These features are the result of the transverse strands having greater mechanical transverse strength than the continuous filaments, for instance, because the strands are of larger cross-section or are of considerable size or have a thickened part at their centre, and so on. Also, the various extrusion passages can be fed independently with plastics of different colours and even of different kinds to provide multiple combinations of colour and mechanical features.

Figure 15:
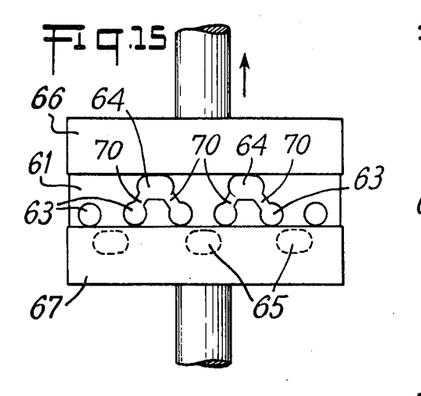
FIGS. 15 and 16 are views of an alternative form of FIG. 11, the blades being shown in one operative position in FIG. 15 and in another in FIG. 16.
Figure 16:
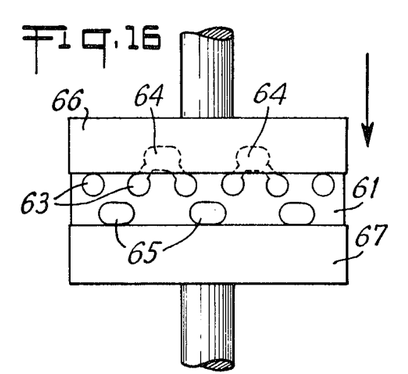

In a variant of the apparatus of FIG. 11, shown in FIGS. 15 and 16, the top die plate passages 64 for extruding transverse strands are connected individually to the continuous filament extrusion orifices 63 of the central die plate; to this end, each passage 64 disposed opposite the space between two adjacent orifices 63 is connected thereto by two side passages 70. Consequently, the transverse strands extruded through the passages of the top die plate are first welded to the continuous filaments extruded through the passages of the centre die plate, before any action by the top blade 66, but the bottom die plate passages 65 for extruding transverse strands remain the same.

Figure 17:
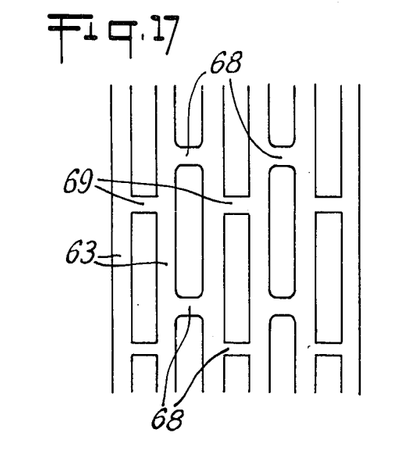
FIG. 17 shows a mesh structure produced by the head of FIG. 15.

The resulting mesh structure is shown in FIG. 17 and has staggered meshes embodied in the machine direction by continuous straight parallel filaments 63 interconnected in pairs by rows of cross-pieces 68, 69 interposed between the continuous filaments. The cross-members or transverse strands 68 coming from the modified passages 64 are slightly curved at their ends, whereas the strands 69 from the unmodified passages 65 are straight.

Figure 18:
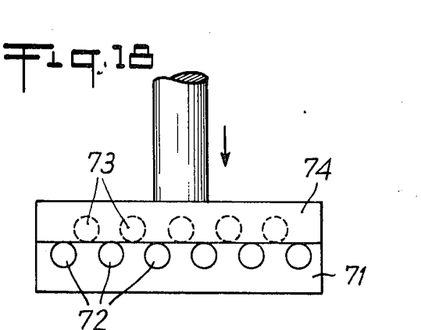
FIGS. 18 and 19 are views of another embodiment of the extrusion head according to the invention, the blade being shown in two operative positions.
Figure 19:
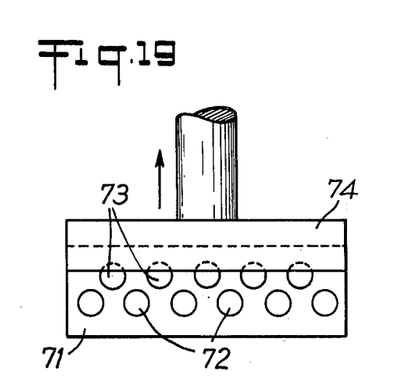

In another embodiment, shown in FIGS. 18 and 19, the extrusion head 71 has:

a row of substantially circular cross-section, permanently open extrusion passages 72 spaced apart by a distance substantially equal to passage diameter, the whole forming a first die plate for extruding continuous filaments, and another row of extrusion passages 73 of the same circular cross-section as the passages 72 and distributed above the row of extrusion passages of the first die plate opposite the spaces therebetween, forming a second die plate for extruding transverse strands.

Figure 20:
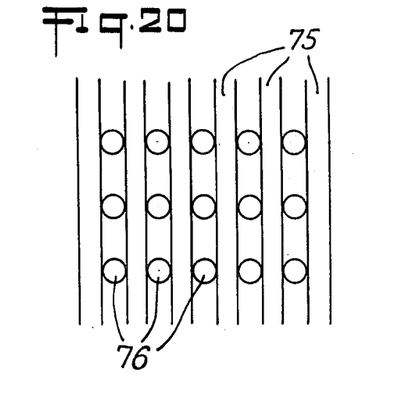
FIG. 20 shows the mesh structure produced by the head of FIGS. 18 and 19.

A single moving blade 74 periodically reciprocates vertically past the orifices of the second die plate passages 73, the amplitude of blade reciprocation being substantially equal to the distance between the top edges of the passages 72 and 73. Consequently, when the blade 74 is at the end of its downwards movement (FIG. 18), it completely closes the top die plate extrusion passages 73, and only the continuous filaments are extruded through the bottom die plate passages 72. When the blade 74 rises (FIG. 19), the top die plate passages 73 are opened and a number of transverse strands 76 are extruded therethrough. Upon its next descent the blade 74 recloses the passages 73 of the top die plate and simultaneously thrusts all the extruded strands 76 between the continuous filaments 75 so as to weld the strands thereto. The results is a mesh structure having substantially rectangular meshes and patterned as shown in FIG. 20.

Of course, to produce a staggered mesh structure by the apparatus shown in FIG. 18, all that is necessary is just to replace the single blade 74 by two complementary blades which move alternately one past the odd extrusion passages and the other past the even extrusion passages of the top die plate.

We claim:

1. An apparatus for making plastics mesh structures and other forms of extruded plastics openwork, characterized in that it comprises an extrusion head adapted to be fed with plastics from an appropriate source such as an extruder, the head comprising:

a. means, including a filament extruding die member having a row of continuously open extrusion orifices distributed in one plane in spaced apart relation, for extruding a plurality of continuous filaments parallel to the direction of extrusion and transversely spaced apart;

b. a strand extruding die member having a row of spaced apart extrusion slits distributed in a plane different from the plane of the extrusion orifices, each extrusion slit being in length at least as great as the spacing between two adjacent extrusion orifices but less than the entire extent across all of the extrusion orifices; and c. means, including a blade associated with the strand extruding die member and mounted for reciprocation relative to the extrusion slits therein between a first position at which the slits are open and a second position at which the slits are closed, for separately extruding, periodically and transversely of the continuous filaments, strands that are discontinuous in a transverse direction and extend across less than all of the plurality of continuous filaments, and for urging the extruded strands into engagement with the extruded continuous filaments.

2. An apparatus as described in claim 1 further comprising a cooling template for simultaneous two-directional orientation and cooling of the extruded mesh structure to impart a final shape and orientation thereto.

3. An apparatus as described in claim 1, wherein the transverse length of each extrusion slit is substantially equal to the spacing between the extrusion orifices such that each strand may be urged into engagement with two adjacent continuous filaments and engaged by its ends thereto.

4. An apparatus according to claim 1, wherein the extruding and urging means includes two complementary blades associated with the strand extruding die member, one blade reciprocating past some of the extrusion slits and the other blade reciprocating past the remainder thereof.

5. An apparatus for making plastics mesh structures and other forms of extruded plastics openwork, characterized in that it comprises an extrusion head adapted to be fed with plastics from an appropriate source such as an extruder, the head comprising:

a. means, including a filament extruding die member having a row of continuously open extrusion orifices distributed in one plane in spaced apart relation, for extruding a plurality of continuous filaments parallel to the direction of extrusion and transversely spaced apart;

b. two strand extruding die members, disposed one above and one below the filament extruding die member, each strand extruding die member having a row of spaced apart extrusion slits distributed in a plane different from the plane of the extrusion orifices, wherein the extrusion slits of each strand extruding die member are each in length at least as great as the spacing between two adjacent extrusion orifices but less than the entire transverse extent across all of the extrusion orifices, and wherein the extrusion slits of one strand extruding die member are offset from the extrusion slits of the other strand extruding die member; and c. means, including two moving blades, each associated with a respective one of the two strand extruding die members and mounted for reciprocation relative to the extrusion slits therein between a first position at which the extrusion slits are open and a second position at which the extrusion slits are closed, for seaprately extruding, periodically and transversely of the continuous filaments, two corresponding sets of strands, one set above and the other below the plurality of extruded continuous filaments, said strands being discontinuous in a transverse direction and extending across less than all of the plurality of continuous filaments, and for urging the extruded strands into engagement with the extruded continuous filaments.

6. An apparatus as described in claim 4, wherein the two moving blades are arranged to simultaneously reciprocate in opposite directions in relation to the strand extruding die members.

7. An apparatus as described in claim 4, wherein the two moving blades are arranged to simultaneously reciprocate in the same direction in relation to the strand extruding die members.

8. An apparatus as described in claim 4, wherein the transverse length of each extrusion slit is greater than the spacing between the extrusion orifices.

9. An apparatus as described in claim 4, wherein the extrusion slits formed in at least one of the strand extruding die members are connected to the extrusion orifices by strand extruding passages.

10. An apparatus as described in claim 4, wherein the transverse length of each extrusion slit is substantially equal to the spacing between the extrusion orifices such that each strand may be urged into engagement with two adjacent continuous filaments and engaged by its ends thereto.

* * * * *

UNITED STATES PATENT AND TRADEMARK OFFICE
CERTIFICATE OF CORRECTION

PATENT NO. : 3,932,092
DATED : January 13, 1976
INVENTOR(S) : Jean-Claude Hureau, et al It is certified that error appears in the above-identified patent and that said Letters Patent are hereby corrected as shown below:

Col. 4, line 10, "of" should read --to--;

Col. 5, line 41, "the" should read --is--;

Col. 6, line 37, "plates" should read --plate--;

Col. 12, line 4, "claim 4" should read --claim 5--;

Col. 12, line 8, "claim 4" should read --claim 5--;

Col. 12, line 12, "claim 4" should read --claim 5--;

Col. 12, line 15, "claim 4" should read --claim 5--; and

Col. 12, line 19, "claim 4" should read --claim 5--.

Signed and Sealed this first Day of June 1976

[SEAL]

Attest:

RUTH C. MASON
*Attesting Officer*

C. MARSHALL DANN
*Commissioner of Patents and Trademarks*